(12) United States Patent
Lain et al.

(10) Patent No.: US 6,387,571 B1
(45) Date of Patent: May 14, 2002

(54) ELECTROLYTE FOR A RECHARGEABLE CELL

(75) Inventors: Michael Jonathan Lain, Abingdon; Robin John Neat, Milton, both of (GB)

(73) Assignee: Accentus plc, Didcot (GB)

( * ) Notice: Subject to any disclaimer, the term of this patent is extended or adjusted under 35 U.S.C. 154(b) by 0 days.

(21) Appl. No.: 09/485,346

(22) PCT Filed: Aug. 11, 1998

(86) PCT No.: PCT/GB98/02416
§ 371 Date: Feb. 8, 2000
§ 102(e) Date: Feb. 8, 2000

(87) PCT Pub. No.: WO99/09606
PCT Pub. Date: Feb. 26, 1999

(30) Foreign Application Priority Data

Aug. 15, 1997 (GB) ............................................. 9717220

(51) Int. Cl.[7] .............................................. H01M 10/40
(52) U.S. Cl. ...................................... 429/303; 429/326
(58) Field of Search ................................ 429/324, 326, 429/347, 303

(56) References Cited

U.S. PATENT DOCUMENTS

| 4,410,609 A | * 10/1983 | Peled et al. ............. 429/326 X |
| 5,470,674 A | * 11/1995 | Doddapaneni et al. .. 429/307 X |
| 6,074,777 A | * 6/2000 | Reimers et al. ......... 429/324 X |
| 6,165,647 A | * 12/2000 | Watanabe et al. ....... 429/326 X |

FOREIGN PATENT DOCUMENTS

| EP | 319182 | * 6/1989 |
| EP | 740359 | * 10/1996 |
| EP | 746050 | * 12/1996 |
| JP | 62-086673 | * 4/1987 |
| JP | 2-207465 | * 2/1989 |
| JP | 7-302614 | * 11/1995 |

OTHER PUBLICATIONS

CHA Et Al, "Polypyridine Complexes of Iron Used as Redox Shuttles For Overcharge Protection of Secondary Lithium Batteries" *J. of Power Sources*, v. 54, No. 2, pp. 255–258, Apr. 1995.*

Richardson ET Al "Overcharge Protection For Rechargeable Lithium Polymer Electrolyte Batteries", *J. Electrochem. Soc.*, v. 143, No. 12, pp. 3992–3996, Dec. 1996.*

* cited by examiner

Primary Examiner—Stephen Kalafut
(74) Attorney, Agent, or Firm—William H. Holt

(57) ABSTRACT

An electrolyte for use in a rechargeable cell whose charging voltage exceeds 3.8 volts includes a redox chemical comprising a substituted aromatic molecule in which α hydrogens are either absent, or are sterically against loss from the ionized form of the molecule. Such as chemical can act as a redox shuttle during overcharge, suppressing damage to the cell and preventing the deposition of metallic lithium during the overcharge of a lithium ion cell, but does not affect normal operation of the cell during either charge or discharge. One such molecule is hexaethyl benzene.

13 Claims, 1 Drawing Sheet

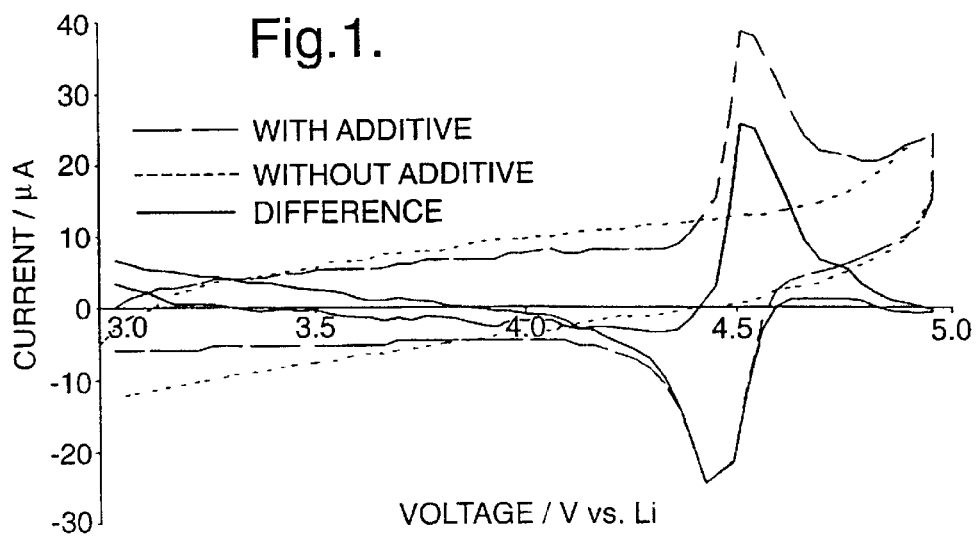
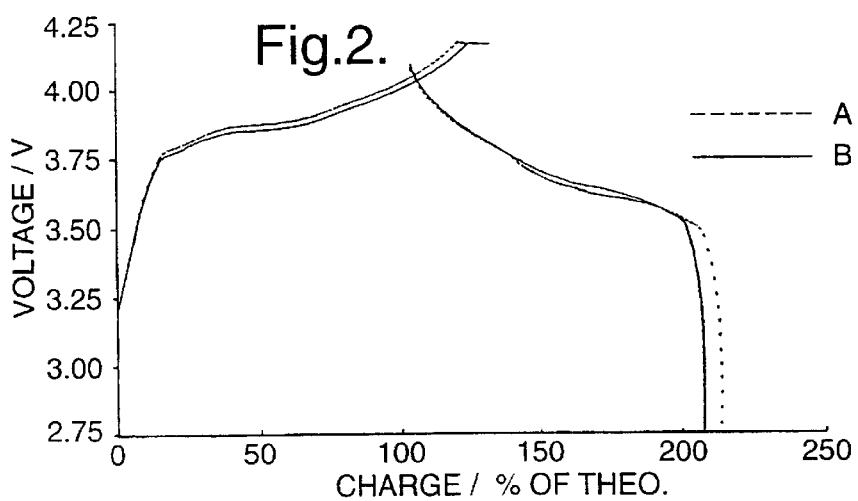
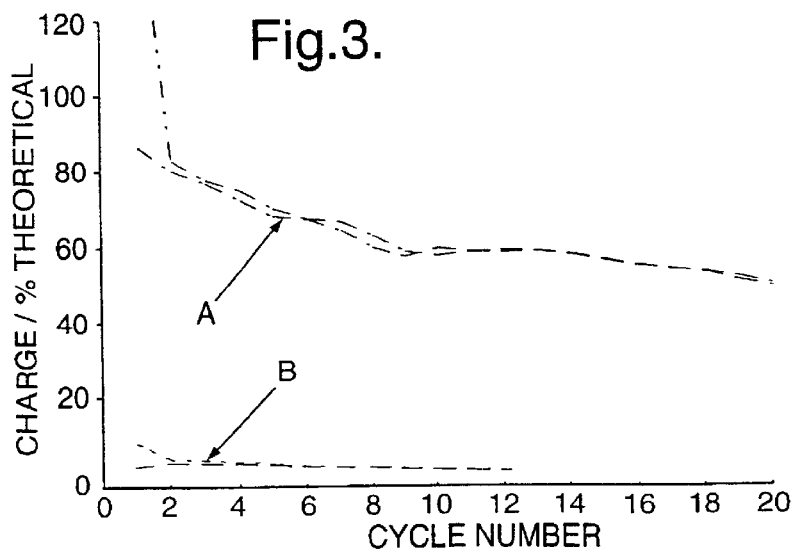

ELECTROLYTE FOR A RECHARGEABLE CELL

This invention relates to an electrolyte for a rechargeable cell, particularly but not exclusively a lithium cell or a lithium ion cell.

Rechargeable cells are known which incorporate an organic electrolyte with a lithium salt such as lithium hexafluorophosphate, a cathode of an insertion material such as titanium disulphide or lithium cobalt oxide into which lithium ions can be inserted, and an anode either of metallic lithium or a lithium alloy ('a lithium cell') or of a different insertion material ('a lithium ion cell') such as graphite. If such a cell is overcharged it may be degraded; this may result from oxidation of the organic solvent, or changes to the electrodes such as deposition of metallic lithium in a lithium ion cell. Overcharging may be prevented by monitoring the voltage of each cell in a battery and regulating it to remain below the voltage threshold at which degradation may occur.

A complementary or alternative approach is to incorporate a redox chemical into the electrolyte which is oxidised at a voltage above the normal cell voltage but below the voltage at which degradation occurs. For example U.S. patent application Ser. No. 744,344 (W. K. Behl) refers to the use of lithium iodide (which is oxidised at about 2.8 V), and describes the use of lithium bromide (which is oxidised at about 3.5 V relative to lithium) as organic electrolyte additives to provide overcharge protection; EP 0 319 182 B (EIC Labs/Abraham et al) describes the use of metallocenes for this purpose, which have redox potentials relative to lithium in the range about 1.7 to 3.7 volts, such as ferrocene for which the redox potential is 3.05 to 3.38 V. However these redox chemicals are not suitable for use in cells where the normal charging cell voltage is above 3.8 volts.

According to the present invention there is provided an electrolyte for use in a rechargeable cell whose voltage exceeds 3.8 volts during charging, the electrolyte including a redox chemical comprising substituted aromatic molecules in which α protons are either absent, or are stabilised by molecular geometry against loss from the ionised form of the molecule.

The term α protons refers to protons attached to carbon atoms next to an aromatic ring. For example the aromatic molecules may be a substituted benzene of the general formula $C_6R^1R^2R^3R^4R^5R^6$ in which:

a) $R^1$ to $R^6$ are selected from trihalomethyl groups, $C_2$ to $C_{10}$ alkyl groups, or halogen-substituted $C_2$ to $C_{10}$ alkyl groups; or b) $R^1$ to $R^5$ are as specified in (a), and $R^6$ is H or a halogen.

In a preferred embodiment $R^1$ to $R^6$ are all $C_2$ to $C_5$ alkyl groups, preferably ethyl groups.

The voltage at which such redox chemicals undergo oxidation varies with the nature of the substituents, but can have values between 3.8 and 5.0 volts relative to $Li/Li^+$. The oxidised form, which is a cation, must be sufficiently stable that it can diffuse through the electrolyte to the other electrode where it is reduced back to its original, unionised, form before it undergoes any competing reactions.

The electrolyte will comprise other ingredients, in particular a salt, and an organic liquid or a polymer. For example it might comprise a solution of lithium hexafluorophosphate (1 molar) in a solvent comprising a mixture of organic carbonates such as ethylene carbonate, propylene carbonate, diethylcarbonate and/or dimethylcarbonate. Alternatively it might comprise a polymer consisting principally of vinylidene fluoride, with a plasticizer such as propylene carbonate and a salt such as lithium perchlorate, which form a gel-like solid electrolyte. In either case the redox chemical must be sufficiently soluble in the other organic ingredients, and it must be able to diffuse through the thickness of the electrolyte.

The invention also provides a rechargeable cell including an electrolyte as specified above. In such a cell the active cathode material is typically $LiCoO_2$, $LiNiO_2$, $LiMnO_2$, or $LiMn_2O_4$ which operate at least partly in the range above 4.0 V, or mixtures of such oxides, or mixed oxides. Although the active anode material might be metallic lithium, the use of graphitic carbon (which can insert lithium to form $LiC_6$) is preferred, as it avoids the potential hazards of metallic lithium.

The invention will now be further and more particularly described, by way of example only, and with reference to the accompanying drawings in which:

FIG. 1 shows cyclic voltammograms for electrolyte with and without a redox chemical;

FIG. 2 shows graphically the variation of cell voltage with charge during the first charge/discharge cycle, for test cells with and without a redox chemical; and FIG. 3 shows graphically the variation of stored charge with cycle number for the said test cells, after repeated overcharging.

Referring to FIG. 1, cyclic voltammetry was performed using an experimental cell with a carbon fibre electrode with a diameter of 7 μm, and a lithium metal foil counter electrode which also acts as a reference electrode, in a 25 $cm^3$ flask. The applied voltage between the electrodes was swept between 3 V and 5 V at a rate of 1 V/s and the current amplified and measured. In both tests the electrolyte was a mixture of organic carbonates such as propylene carbonate and diethyl carbonate (PC, DEC) with 1 mole/litre of $LiPF_6$. In one test hexaethylbenzene was added at 0.01 mol/litre as additive, but not in the other.

The graph shows as broken lines the variations of current with voltage for the two tests, and as a solid line the difference between the two currents. It is evident from the difference that there is an oxidation peak at around 4.5 V, and that this is associated with a reduction peak at about the same voltage on the reverse sweep. This reverse peak shows that the oxidation of the hexaethylbenzene is reversible, and that the oxidised (cationic) form is stable for at least about 1 s in this electrolyte.

Test cells were made using carbon coated onto copper foil as anode, and $LiCoO_2$ and carbon coated onto aluminium foil as cathode, the coatings including polyvinylidene fluoride (PVdF) as a binder and being on both sides of each of the foils. Electrical connection to the foils was obtained by removing the coating over a small area and spot welding an aluminium tag to the aluminium foil and a nickel tag to the copper foil. Rectangular strips of anode and cathode material were then wound into a spiral with sheets of separator material between them, and encased in a metal can with an insulator on the base. The cells each had a theoretical capacity of 1400 mAh. Liquid electrolytes similar to those used in the voltammetry tests were then used to fill the cells, under a partial vacuum to preventing gas bubbles remaining. In half the cells the organic carbonate/$LiPF_6$ electrolyte had no additive, and in the other cells hexaethylbenzene was also included at a concentration between 0.005 mol/litre and 0.1 mol/litre; in the cell A whose behaviour is shown in FIGS. 2 and 3 the hexaethylbenzene was 0.058 mol/litre.

Referring to FIG. 2 the first charge and discharge cycles are shown for a cell A with the additive, and for a cell B without. This cycle was performed at the C/10 rate, that is 140 mA, between voltage limits of 2.75 V and 4.2 V, and with a 2 hour hold at 4.2 V. The graphs show that the additive has little effect on the cell behaviour during the first cycle.

The cells A and B were then subjected to 11.5 charge and discharge cycles at 270 mA between 2.75 V and 4.2 V, so they ended up charged. Cell B's capacity after charging gradually decreased from 115% of its theoretical value to 106%, and its current efficiency gradually increased from about 94.5% to about 97%. Cell A behaved similarly, its capacity after charging decreasing from about 113% to 107%, and its current efficiency increasing from about 98.3% to a plateau at around 99.3%.

The cells A and B were then overcharged, cycling at 270 mA between voltage limits of 4.0 V and 5.0 V for a period of 18 hours. Cell B experienced 250 cycles, and cell A experienced 150 cycles. After overcharging the cells, the voltage limits of 2.75 V and 4.2 V were then reimposed. Referring to FIG. 3 this shows graphically the cell capacity for these subsequent cycles for the cells A and B; for cell A the capacity on charging is slightly higher than that on discharging, whereas for cell B the capacity on discharging was slightly higher. Cycling of cell B was terminated after 12 cycles, whereas cell A experienced over 200 cycles.

It is evident from the results shown in FIG. 3 that the presence of the redox additive, hexaethylbenzene, in the electrolyte of cell A markedly enhanced the performance of the cell when it had been overcharged. Whereas the capacity of cell B after repeated overcharging was reduced to less than 5% of its theoretical value, the cell A had lost much less of its capacity.

Similar tests have been carried out with other cells with and without this redox additive. The results described above, showing that in normal operation the additive does not degrade cell performance, have been obtained consistently. The performance of cells during and after overcharge have not been as consistent, and appear to depend at least partly on how the overcharge is brought about. In particular where cells were overcharged to the 5.0 V limit directly from the discharged state (2.75 V), it appears that the extent of overcharge (expressed as a percentage of the theoretical charge) is an important consideration.

What is claimed is:

1. An electrolyte for use in a rechargeable lithium or lithium ion cell whose voltage exceeds 3.8 volts during charging, the electrolyte comprising a lithium salt in solution in an organic solvent, the electrolyte also comprising an organic polymer, so it is a polymeric gel electrolyte, wherein the electrolyte includes a redox chemical comprising substituted aromatic molecules in which there are a protons, and the a protons are stabilized by molecular geometry against loss from the ionized form of the molecule.

2. An electrolyte as claimed in claim 1 wherein the redox chemical is at a concentration between 0.005 mole/liter and 0.1 mole/liter.

3. An electrolyte as claimed in claim 1 wherein the solvent comprises at least one organic carbonate.

4. A rechargeable cell including an electrolyte as claimed in claim 1.

5. A rechargeable cell as claimed in claim 4 including an anode comprising carbon, a cathode comprising an oxide of a transition metal, such that lithium ions can be reversibly intercalated into both the carbon of the anode and the oxide of the cathode, the anode and the cathode being separated by the electrolyte.

6. An electrolyte for use in a rechargeable lithium or lithium ion cell whose voltage exceeds 3.8 volts during charging, the electrolyte comprising a lithium salt in solution in an organic solvent, wherein the electrolyte includes a redox chemical comprising a substituted benzene of the general formula $C_6R^1R^2R^3R^4R^5R^6$ in which:

a) $R^1$ to $R^6$ are selected from trihalomethyl groups, $C_2$ to $C_{10}$ alkyl groups, or halogen-substituted $C_2$ to $C_{10}$ alkyl groups; or b) $R^1$ to $R^5$ are as specified in (a), and $R^6$ is H or a halogen, so that α protons are either absent, or are stabilized by molecular geometry against loss from the ionized form of the molecule.

7. An electrolyte as claimed in claim 6 wherein $R^1$ to $R^6$ are all $C_2$ to $C_5$, alkyl groups.

8. An electrolyte as claimed in claim 7 wherein $R^1$ to $R^6$ are all ethyl groups.

9. An electrolyte as claimed in claim 1 wherein the redox chemical is at a concentration between 0.005 mole/liter and 0.1 mole/liter.

10. An electrolyte as claimed in claim 6 wherein the solvent comprises at least one organic carbonate.

11. An electrolyte as claimed in claim 6 also comprising an organic polymer, so it is a polymeric gel electrolyte.

12. A rechargeable cell including an electrolyte as claimed in claim 6.

13. A rechargeable cell as claimed in claim 12 including an anode comprising carbon, cathode comprising an oxide of a transition metal, such that lithium ions can be reversibly intercalated into both the carbon of the anode and the oxide of the cathode, the anode and the cathode being separated by the electrolyte.

* * * * *

UNITED STATES PATENT AND TRADEMARK OFFICE
CERTIFICATE OF CORRECTION

PATENT NO. : 6,387,571 B1
DATED : May 14, 2002
INVENTOR(S) : Michael Jonathan Lain and Robin John Neat It is certified that error appears in the above-identified patent and that said Letters Patent is hereby corrected as shown below:

<u>Title page,</u>
Item [87], the PCT Pub. Date is changed to -- Feb. 25, 1999. --
ABSTRACT,
Line 4, -- stabilized -- is inserted after "sterically".
Line 5, "Such as" is corrected to -- Such a --.

Signed and Sealed this

Third Day of September, 2002

*Attest:*

*Attesting Officer*

JAMES E. ROGAN
*Director of the United States Patent and Trademark Office*